(12) United States Patent
Fukuda et al.

(10) Patent No.: US 11,412,670 B2
(45) Date of Patent: Aug. 16, 2022

(54) HYDROMULCHING MATERIAL COMPRISING KURAPIA AND HYDROMULCHING METHOD

(71) Applicant: Greenproduce Company Limited, Tochigi (JP)

(72) Inventors: Atsushi Fukuda, Tokyo (JP); Takashi Murano, Tokyo (JP); Masaharu Ebisawa, Tokyo (JP); Masataka Ohde, Tochigi (JP)

(73) Assignee: Greenproduce Company Limited, Oyama (JP)

( * ) Notice: Subject to any disclaimer, the term of this patent is extended or adjusted under 35 U.S.C. 154(b) by 190 days.

(21) Appl. No.: 17/076,430

(22) Filed: Oct. 21, 2020

(65) Prior Publication Data

US 2021/0243966 A1    Aug. 12, 2021

(30) Foreign Application Priority Data

Feb. 10, 2020 (JP) .............................. JP2020-020532

(51) Int. Cl.
*A01G 13/02* (2006.01)
*A01G 13/00* (2006.01)

(52) U.S. Cl.
CPC ...... *A01G 13/0262* (2013.01); *A01G 13/0287* (2013.01); *A01G 2013/004* (2013.01)

(58) Field of Classification Search
CPC ..................... A01G 13/0262; A01G 2013/004
See application file for complete search history.

(56) References Cited

U.S. PATENT DOCUMENTS 5,695,301 A * 12/1997 Higgins ............. A01G 13/0262
71/15
2013/0047504 A1* 2/2013 Gauthier .............. A01K 1/0154
47/58.1 SC

FOREIGN PATENT DOCUMENTS

JP    2011-196074 A    10/2011
JP    5222259 B2       6/2013

* cited by examiner

*Primary Examiner* — Jessica B Wong
(74) *Attorney, Agent, or Firm* — Apex Jurics, pllc; Hilde Coeckx

(57) ABSTRACT

A hydromulching material includes a mixture of: Kurapia cut seedlings prepared by cutting Kurapia stem into pieces each on the order of averagely 4 cm in length; seeds of sterile annual plant; and soil dressing.

8 Claims, 3 Drawing Sheets

HYDROMULCHING MATERIAL COMPRISING KURAPIA AND HYDROMULCHING METHOD

CROSS REFERENCE TO RELATED APPLICATIONS

This application claims the benefit of priority under the Paris Convention upon Japanese Patent Application No. 2020-020532, filed on Feb. 10, 2020, of which full contents are incorporated herein by reference.

BACKGROUND OF THE INVENTION

Field of the Invention

The present invention relates to a hydromulching material and a hydromulching method for planting plant seedlings on a slope and the like for the greening of the slope and the like.

Description of the Background Art

Conventionally, as a method for the greening of a slope and the like, the following methods have been applied:
(1) turf-spraying method;
(2) sodding method;
(3) greening method through the use of allelopathic annual plants;
(4) greening method through the use of allelopathic perennial plants;
(5) greening method through the use of non-allelopathic ground covers;
(6) greening method through the use of buckwheat and centipede grass.

(1) The turf-spraying method, including a step of spraying turf seeds over the ground surface, has often been applied for road slopes and the like.

Such a turf-spraying method includes a planting method intended for constructing the ground surface such that the ground surface is covered with plants.

The reason for using turf is that the turf grows early. After the turf withers within 1 year, weeds are allowed to grow on the ground, which results in the weed-grown ground. There has been a need, therefore, to get rid of weeds from the ground every year. Further, the turf to be used for spraying has been an introduced variety.

(2) The sodding method includes a construction method for the greening, by which cut turf pieces each having a planar shape and a size of approximately 30 cm×30 cm are arranged over the ground surface, has often been applied for riverbank and the like.

Turf to be used for the sodding method has been a local variety such as *Zoysia japonica* or *Zoysia tenuifolia*. Approximately 30 cm×30 cm planar cut turf pieces have been manually arranged over the ground surface, whose work has been as low as 300 m$^2$/day in quantity and efficiency. Further, for maintaining a turf green area, at least 4 times of weeding has been required every year, which has led to expense in time and effort for the maintenance and management.

(3) The greening method through the use of allelopathic annual plants includes a construction method for the greening by using hairy vetch, buckwheat, and the like.

Buckwheat and hairy vetch as an introduced variety are annual plants, and there has been a need, therefore, to plant such plants every year. From this regard, the planting area has not been a permanent green area. Further, buckwheat has grown to a plant height of substantially 1 m.

(4) The greening method through the use of allelopathic perennial plants includes a construction method for the greening to reduce the degree of weed growth by using centipede grass.

The centipede grass as an introduced variety tends to grow slowly and often compete with weeds during its growth. For this reason, approximately 4 times of getting rid of weeds and supplemental planting over the first year of planting have been required, and 2 years on average have been taken for thick growth.

(5) The greening method through the use of non-allelopathic ground covers includes a construction method for the greening by using moss *phlox*, *mondo* grass, and the like. Ground covers, having dense covering of the ground surface with their low plant heights, could achieve an effect of reducing the degree of weed growth.

Moss *phlox* and *mondo* grass as perennials have not required any annual planting; however, planting these perennials in pots by humans has been required. Further, due to the fact that their growth is so slow, the number of planting potted moss *phlox* as large as 16 to 25 pots/m$^2$ and the number of potted *mondo* grass as large as 25 to 30 pots/m$^2$ have been required in compensation for slowness, which has led to expense in time and effort. Further expense in time and effort to get rid of weeds has been required until the ground surface is covered with these perennials.

(6) The greening method through the use of buckwheat and centipede grass includes a construction method for the greening to reduce the degree of weed growth through early covering with buckwheat as an annual plant and permanent covering with centipede grass as a perennial plant.

Buckwheat includes a plant having a tendency to wither to die when being damaged by frost. Frosting occurs under the climatic conditions of an environmental temperature of lower than or equal to 4° C. and a mean wind velocity of lower than or equal to 3 m/s. The sowing period of time of buckwheat falls within a range from May to August during which no frosting occurs. For this reason, this greening method could not be performed in March as a busy month for public works in, e.g., Japan. Further, buckwheat has grown to a plant height of substantially 1 m. Centipede grass had problems described in item (4) above.

Conventional methods have their respective drawbacks as described above. In recent years, "Kurapia cut-seedling hydromulching method" described in Japanese Patent No. 5222259 has been broadly performed.

Kurapia is an improved cultivar of Japanese native plant, *Phyla nodiflora*, and grows with its leaves growing thick at a growth rate approximately 10 times faster than that of turf. Kurapia has a weed-suppression function of suppressing weed growth in such a manner that the ground surface is covered densely with Kurapia, thereby forming a green area on the ground surface to prevent weed seeds from rooting to the ground surface.

PRIOR ART DOCUMENTS

Patent Documents

Patent Document 1: Japanese Patent No. 5222259

Problems to be Solved

Most construction works for the greening of slopes are public works, and therefore, such public works are generally performed in March in, e.g., Japan.

Kurapia starts growing at an environmental temperature of higher than or equal to 15° C. When a greening work is performed through the use of Kurapia in, e.g., the Kanto plains in March, Kurapia starts growing in early May where an environmental temperature reaches or exceeds 15° C., and in about August, the ground surface is covered with the grown Kurapia. As such, Kurapia has taken time until the ground surface is covered with Kurapia after the work.

For this reason, there have been the following technical problems in conventional Kurapia cut-seedling hydromulching methods:

(1) Kurapia, with which the ground surface is covered, has a weed-suppression function of so suppressing weed seeds coming flying as to prevent such weed seeds from rooting to the ground surface; however, Kurapia does not exhibit such a function during a period of time over which the ground surface is not fully covered with Kurapia. Under the covering of the ground surface with Kurapia, therefore, works of getting rid of weeds from the ground surface have been required in a similar manner to those required for a place in a bare ground state.

(2) As a result of the ground surface being covered with Kurapia, soil erosion of the ground surface could be prevented; however, there has been a probability that such soil erosion would take place on a surface in a bare ground state not covered with Kurapia.

(3) Due to dust clouds being raised from a surface in a bare ground state until such a surface is fully covered with Kurapia, there has been a probability that a living environment around the work site would be worsen.

SUMMARY OF THE INVENTION

The objective of the present invention is to provide a hydromulching material and a hydromulching method through the use of the hydromulching material for early covering of a ground surface with Kurapia as well as permanent suppression of weeds, prevention of soil erosion, and the like, for such Kurapia-covered ground surface.

Means for Solving Problems

In a first aspect of the present invention made to solve the above-described technical problems, there is provided a hydromulching material comprising a mixture of: Kurapia cut seedlings prepared by cutting Kurapia stem into pieces each on the order of averagely 4 cm in length; seeds of sterile annual plant; and soil dressing.

In a second aspect of the present invention, in the hydromulching material as the first aspect of the present invention, the sterile annual plant includes an intermediate ryegrass variety or an annual ryegrass variety.

In a third aspect of the present invention, in the hydromulching material as the first or second aspect of the present invention, an amount of the seeds of the sterile annual plant in the mixture is in a range from 15 to 30 g per a unit spray area of 1 m².

In a fourth aspect of the present invention, there is provided a hydromulching method comprising the step of: spraying the hydromulching material, as any one of the first to third aspects of the present invention, over a target position through the use of a soil-dressing spray apparatus.

Advantageous Effects of the Invention

According to the present invention, the following advantageous effects could be achieved by the above-described aspects for solving the technical problems.

(1) The ground surface could be covered with the sterile annual plant quickly, thereby capable of forming a green area on the ground surface to suppress weeds grown on the ground surface.

(2) The ground surface could be covered with the sterile annual plant quickly, thereby capable of forming a green area on the ground surface to prevent soil erosion of the ground surface.

(3) The ground surface could be covered with the sterile annual plant quickly, thereby capable of forming a green area on the ground surface to suppress dust clouds raised from the ground surface.

(4) Around when the ground surface is covered with Kurapia, the sterile annual plant withers while a green area is formed by the covering of the ground surface with Kurapia.

(5) On and after the second year, no sterile annual plant buds and grows while the green area formed by the covering of the ground surface with Kurapia as perennial plant could be maintained, thereby capable of permanently suppressing weeds grown on the ground surface, preventing soil erosion of the ground surface, and suppressing dust clouds raised from the ground surface.

BRIEF DESCRIPTIONS OF THE DRAWINGS

DESCRIPTIONS OF EMBODIMENTS OF THE INVENTION

Figure 1:
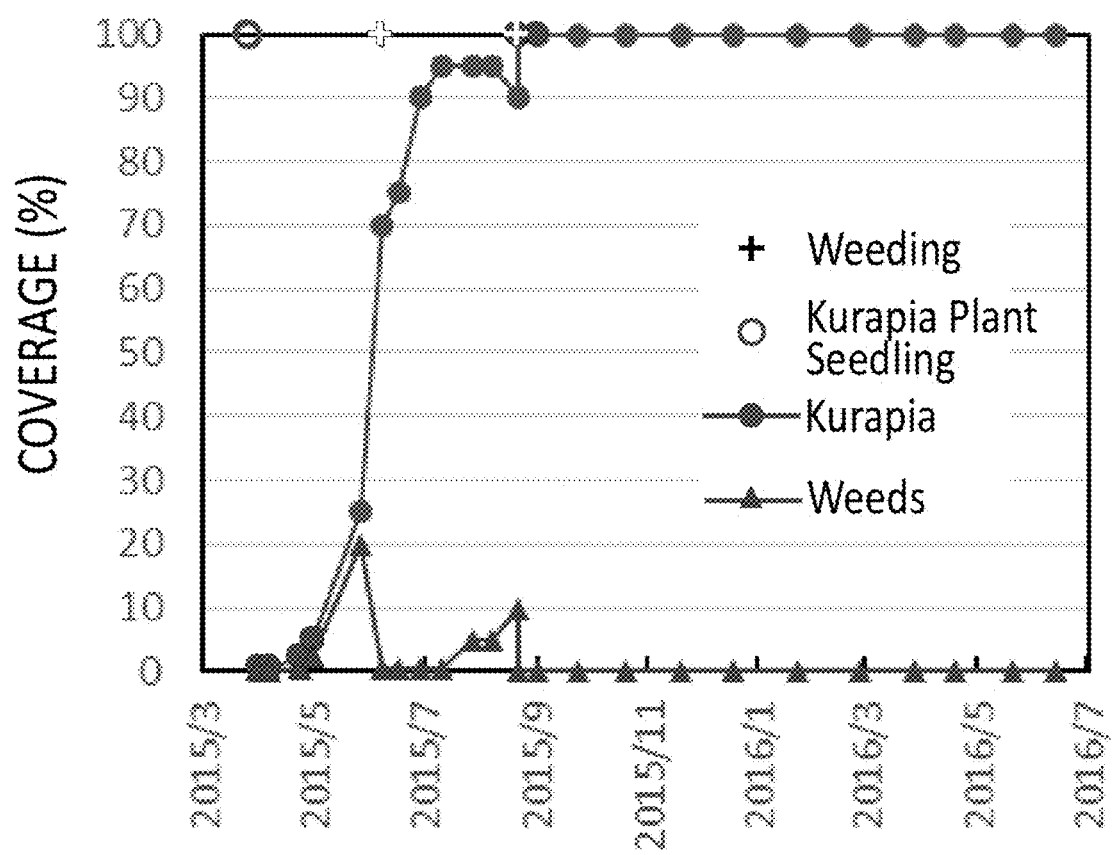
FIG. 1 depicts a graph showing a time-dependent coverage of the ground surface in a work experiment of a conventional Kurapia cut-seedling hydromulching method.

Hereinafter, embodiments according to the present invention will be explained.

Examples (1) Hydromulching Material (Compositions)

A hydromulching material according to the present invention is used for the greening of the ground surface such as a slope.

The hydromulching material according to the present invention includes a mixture prepared by the mixing of: Kurapia cut seedlings; seeds of sterile annual plant; soil dressing; soil-erosion prevention material; adhesive; fertilizer; and the like.

The hydromulching material is sprayed over the ground surface through the use of a conventionally known soil-dressing spray apparatus.

(2) Kurapia

Kurapia is an improved cultivar of Japanese native plant, *Phyla nodiflora*.

Kurapia grows with its leaves growing thick at a growth rate approximately 10 times faster than that of turf. Kurapia has a weed-suppression function of suppressing weed growth in such a manner that the ground surface is covered densely with Kurapia, thereby forming a green area on the ground surface to prevent weed seeds from rooting to the ground surface. As a result, the number of works to get rid of weeds and the expense in time and effort to get rid of weeds for each work decrease, so that the costs required for the greening and the costs for the maintenance and management could be reduced.

Further, Kurapia is a perennial plant, and therefore, the green area formed by the covering of the ground surface with Kurapia as the perennial plant could be maintained on and after the second year.

Kurapia stem is cut into pieces each of which is on the order of averagely 4 cm in length, and Kurapia cut seedlings thus obtained are used for spraying.

Kurapia stem could be cut by a cutting method disclosed in Patent Document 1 as described above; however, the cutting method should not be limited thereto, and any conventionally known methods may be applied.

(2.1) Growth of Kurapia

Kurapia starts growing at an environmental temperature of higher than or equal to 15° C. When Kurapia is sprayed over the ground surface within the Kanto plains in March, it starts growing in early May where an environmental temperature reaches or exceeds 15° C., and then, the ground surface is covered with the grown Kurapia in about June to September.

(3) Sterile Annual Plant

Sterile annual plants are annual plants having sterility.

An intermediate ryegrass variety or an annual ryegrass variety are preferable for the variety of the sterile annual plant.

The sterile annual plant is sprayed in the form of seeds.

(3.1) Growth of Sterile Annual Plant

When the sterile annual plant is sprayed within the Kanto plains in March, the ground surface is covered with the plant early within a period of time as short as 1 month, and thereafter, the plant withers in the summer.

Further, the sterile annual plant does not bud and grow on and after the second year because of its sterility.

(4) Combination of Kurapia and Sterile Annual Plant

The Kurapia cut seedlings and the seeds of the sterile annual plant are mixed, and a resultant mixture is sprayed, so that the greening develops as follows:

(a) When the mixture is sprayed over the ground surface within the Kanto plains in March, the ground surface is covered with the sterile annual plant within a period of time on the order of 1 month, earlier than the covering with Kurapia, thereby forming a green area on the ground surface so as to prevent weed seeds from rooting to the ground surface, suppress weeds grown on the ground surface, prevent soil erosion of the ground surface, and suppress dust clouds raised from the ground surface.

(b) The green area formed by the covering of the ground surface with the sterile annual plant is maintained until late June. In July, the sterile annual plant starts withering, the ground surface is gradually covered with Kurapia as it grows. In about August, the ground surface is so covered with Kurapia that a green area is formed thereon. On and after August, the ground surface is so covered with Kurapia as to suppress weeds grown thereon, prevent soil erosion thereof, and suppress dust clouds raised therefrom.

(c) In the winter, Kurapia seasonally goes dormant; however, on and after the second year, the green area formed by the covering with Kurapia as a perennial plant is maintained, and as a result, permanent suppression of weeds, prevention of soil erosion, and the like could be achieved. Sterile annual plants do not bud and grow on and after the second year.

(5) Mixing

The Kurapia cut seedlings and the seeds of the sterile annual plant are introduced into a mixer.

In addition to the Kurapia cut seedlings and the seeds of the sterile annual plant, soil dressing, soil-erosion prevention material, adhesive, fertilizer, and the like as well as water are introduced together into the mixer, and the introduced materials are mixed by the mixer, and as a result, a slurry mixture is formed in the mixer.

(5.1) Materials for Mixing with Kurapia/Sterile Annual Plant

Materials to be mixed with the Kurapia cut seedlings and the seeds of the sterile annual plant by the mixer are in the followings:

The soil-erosion prevention material includes, e.g., the trade name "Kuricoat (Registered Trademark) C-710", composed mainly of a synthetic resin emulsion.

The adhesive includes, e.g., the trade name "Kuricoat (Registered Trademark) C-402", composed mainly of water-soluble synthetic polymer.

The fertilizer includes high analysis compound fertilizer composed mainly of nitrogen, phosphoric acid, and potassium, at each ratio of 15%.

(5.2) Mixing Amount

The mixing amount per spray area of each of the above materials is preferably in the followings as shown in TABLE 1.

The reason for mixing a large amount of the soil dressing in comparison with those of other materials, is to avoid damage to the Kurapia cut seedlings upon spraying. The soil dressing is preferably mixed in an amount at least 10 times greater than that of the Kurapia cut seedlings.

With such ratios, the soil dressing in the slurry mixture could serve as a buffer or cushion to reduce the spray pressure upon spraying so as to avoid damage to the Kurapia cut seedlings.

It is to be noted that an amount of the water is appropriately adjusted by a worker through the use of approximately half an amount of the soil dressing as a measure in accordance with a water content in the soil dressing.

TABLE 1

| Spray material (unit) | Kurapia (g/m$^2$) | Soil dressing (l/m$^2$) | Soil-erosion prevention material (g/m$^2$) | Adhesive (g/m$^2$) | Fertilizer (g/m$^2$) | Sterile annual plant seeds (g/m$^2$) |
| --- | --- | --- | --- | --- | --- | --- |
| Quantity | 96 | 12 | 24 | 0.6 | 60 | 15-30 |

(6) Hydromulching Method

The slurry mixture obtained by the mixing is sprayed over a target position, through the use of the soil-dressing spray apparatus in the following steps:

(i) A work area to be subjected to a single spraying of the soil-dressing spray apparatus is clearly specified, in advance, with a marker and the like on the ground surface to be sprayed over.

(ii) Amounts of materials to be applied for the work area to be subjected to the single spraying are weighed in their respective predetermined ratios.

(iii) All the weighed amounts of spraying materials are introduced into a tank of the soil-dressing spray apparatus, and the introduced materials are stirred in such a manner that the materials are uniformly mixed.

(iv) Spraying of the resultant material is performed through the use of the soil-dressing spray apparatus.

(7) Work Experiment

A work experiment was performed for the above-described embodiments according to present invention in the followings.

Work date: 26 Mar. 2015
Work site: Yokohama city, Kanagawa prefecture, Japan

|  | Reference data | Experimental data 1 | Experimental data 2 |
| --- | --- | --- | --- |
| Kurapia cut seedlings (g/cm$^2$) | 96 | 96 | 96 |
| Sterile annual plant seeds (g/cm$^2$) | 0 | 15 | 30 |
| Weeding • Mowing | 2 times | 2 times | 2 times |

Figure 2:
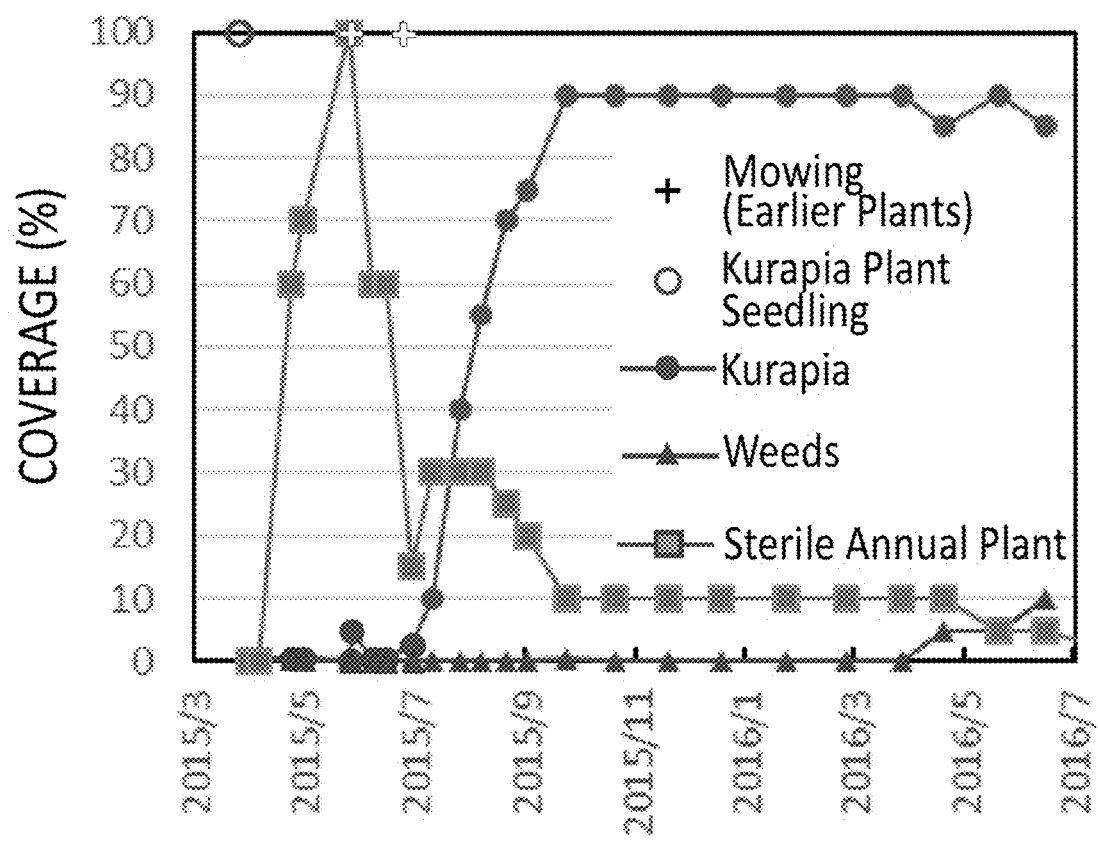
FIG. 2 depicts a graph (1) showing a time-dependent coverage of the ground surface in a work experiment of a hydromulching method through the use of a hydromulching material according to the present invention.
Figure 3:
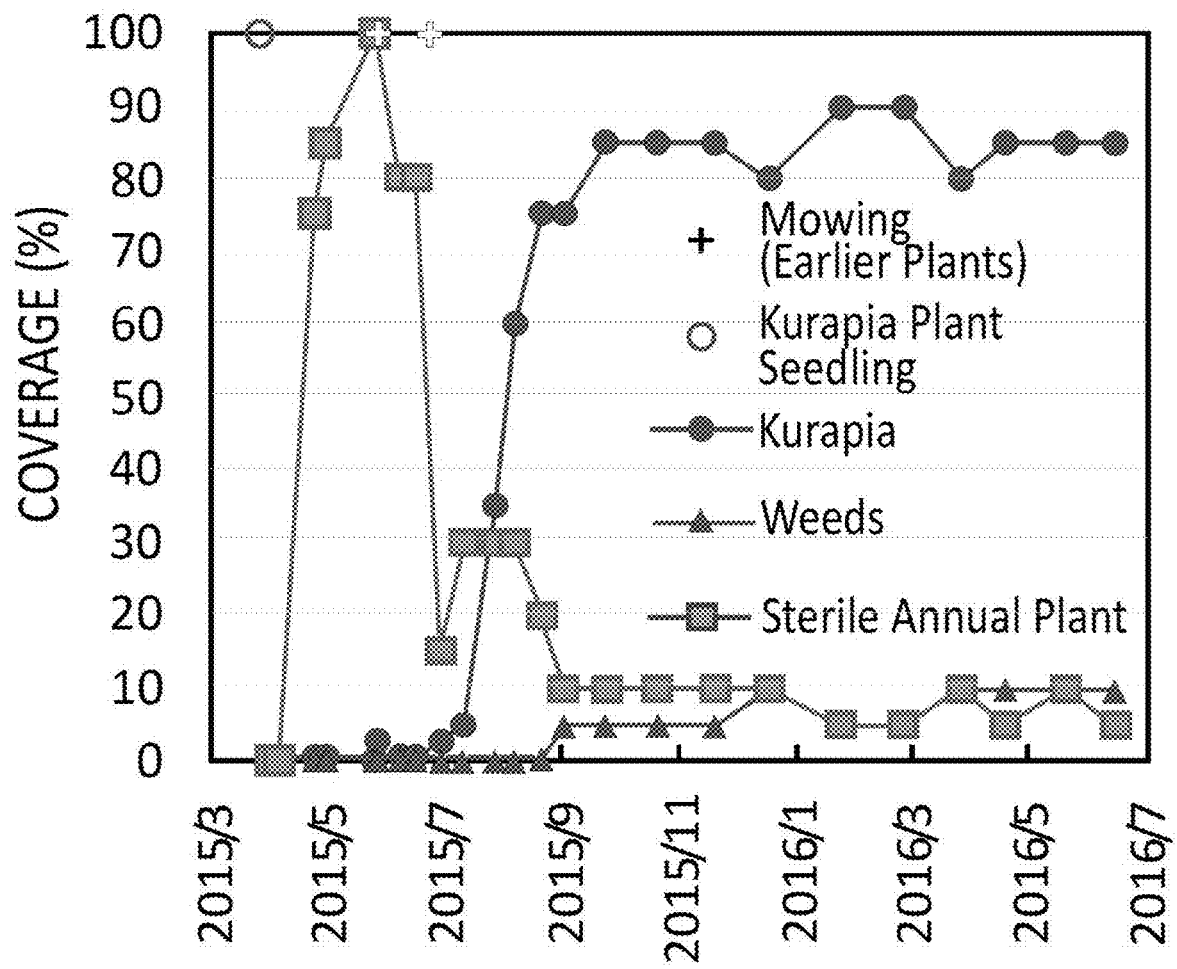
FIG. 3 depicts another graph (2) showing a time-dependent coverage of the ground surface in a work experiment of a hydromulching method through the use of a hydromulching material according to the present invention.

FIGS. 1-3 each shows a time-dependent coverage of the ground surface, i.e., the coverage of the ground surface as a function of period of time, in each work experiment for reference data, experimental data 1, and experimental data 2.

Reference data (FIG. 1) includes a result of performing a hydromulching method, as a conventional technique, through the use of Kurapia cut seedlings.

The coverage in May 2015 is 25% with Kurapia, and 20% with weeds. Such a coverage with weeds, 20%, is set to be a reference value for performing the weeding in the conventional method. After having performed weeding once, the coverage with Kurapia reaches the reference value as a measure for the greening, i.e., 75%-coverage (Japan Road Association, Road earthwork cutting-slope stabilization work guidelines (the 2009 edition) p. 258), in mid-June 2015.

Experimental data 1 (FIG. 2) is a result of performing an example of work according to the present invention (Kurapia cut seedlings: 96 g/m$^2$; seeds of sterile annual plants: 15 g/m$^2$; and sterile annual plants subjected 2 times of mowing).

The coverage with the sterile annual plants reaches the coverage, 75%, in early May. Such a coverage, 75%, is achieved with the sterile annual plants at least 1 month earlier than the same coverage is achieved with Kurapia cut seedlings alone in mid-June as shown in FIG. 1. Further, the coverage with the sterile annual plants reaches 100% in late May.

Subsequently, in order to promote switching from the sterile annual plants to perennial Kurapia, the sterile annual plants are mown 2 times, in late May and in late June, respectively. After having performed 2 times of mowing, the sterile annual plants decline as increase in environmental temperature, and instead Kurapia increases in coverage such that the coverage reaches 75% in early September, and is maintained at almost 90% on and after late September. Almost no weed occurs within a time window from the beginning of the experiment, March 2015, to June 2016.

Experimental data 2 (FIG. 3) is a result of performing another example of work according to the present invention (Kurapia cut seedlings: 96 g/m$^2$; seeds of sterile annual plants 30 g/m$^2$; sterile annual plants subjected to 2 times of mowing).

The coverage with the sterile annual plants reaches the coverage, 75%, in late April, and reaches 100% in late May.

Subsequently, mowing is performed 2 times, in late May and in late June, respectively.

And thereafter, the sterile annual plants decline, and instead Kurapia increases in coverage such that the coverage reaches 75% in late August. Weeds are suppressed from the beginning of the experiment, March 2015, to June 2016 to such an extent that the coverage with weeds is suppressed at most 10%.

In view of the above experimental results, the followings could be found:

(a) According to an example of the present invention by which seeds of sterile annual plants and Kurapia cut seedlings are mixed together to be sprayed, the ground surface is covered with the sterile annual plants at least 1 month earlier than the coverage with Kurapia as a result of being applied with a conventional technique. In such a conventional technique, "Kurapia cut-seedling hydromulching method," the ground surface is covered with Kurapia cut seedlings alone. Soil erosion of the ground surface and dust clouds raised from the ground surface could, therefore, be reduced.

(b) When the conventional technique, "Kurapia cut-seedling hydromulching method," is applied, there is a need to get rid of weeds whose coverage reaches 20% in May. On the other hand, according to an example of the present invention, the coverage with weeds is suppressed at lower during a period of time including May. There is a need for the sterile annual plants to be subjected to mowing without any need at all for weeds to be subjected to weeding. There are better advantageous effects achieved by an example of the present invention, in reducing weeds grown on the ground surface and expense in time and effort to get rid of weeds from the ground surface, in comparison with a conventional technique.

What is claimed is:

1. A hydromulching material comprising a mixture of:
   Kurapia cut seedlings prepared by cutting Kurapia stem into pieces each on the order of averagely 4 cm in length;
   seeds of sterile annual plant; and
   soil dressing.

2. The hydromulching material according to claim 1, wherein the sterile annual plant includes an intermediate ryegrass variety or an annual ryegrass variety.

3. The hydromulching material according to claim 1, wherein an amount of the seeds of the sterile annual plant in the mixture is in a range from 15 to 30 g per a unit spray area of 1 m$^2$.

4. The hydromulching material according to claim 2, wherein an amount of the seeds of the sterile annual plant in the mixture is in a range from 15 to 30 g per a unit spray area of 1 m$^2$.

5. A hydromulching method comprising the step of:
   spraying the hydromulching material according to claim 1 over a target position through the use of a soil-dressing spray apparatus.

6. A hydromulching method comprising the step of:
   spraying the hydromulching material according to claim 2 over a target position through the use of a soil-dressing spray apparatus.

7. A hydromulching method comprising the step of:
   spraying the hydromulching material according to claim 3 over a target position through the use of a soil-dressing spray apparatus.

8. A hydromulching method comprising the step of:
spraying the hydromulching material according to claim 4 over a target position through the use of a soil-dressing spray apparatus.

* * * * *